United States Patent
Pyhälammi et al.

(10) Patent No.: US 6,820,116 B1
(45) Date of Patent: Nov. 16, 2004

(54) MOBILE BROWSING BOOSTER SYSTEM

(75) Inventors: Seppo Pyhälammi, Helsinki (FI); Kaj Häggman, Espoo (FI); Iikka Aartolahti, Espoo (FI); Markku Rauhamaa, Helsinki (FI)

(73) Assignee: Nokia Corporation, Espoo (FI)

( * ) Notice: Subject to any disclaimer, the term of this patent is extended or adjusted under 35 U.S.C. 154(b) by 110 days.

(21) Appl. No.: 10/029,743

(22) Filed: Dec. 21, 2001

(51) Int. Cl.$^7$ .............................................. G06F 17/30
(52) U.S. Cl. ..................... 709/219; 709/224
(58) Field of Search ................. 707/217, 218, 707/219, 224, 203

(56) References Cited

U.S. PATENT DOCUMENTS

| | | | | |
|---|---|---|---|---|
| 5,216,515 A | | 6/1993 | Steele et al. ................ | 358/335 |
| 5,463,620 A | | 10/1995 | Sriram ......................... | 370/60 |
| 5,491,820 A | * | 2/1996 | Belove et al. ................. | 707/3 |
| 5,635,918 A | | 6/1997 | Tett ............................ | 340/7.29 |
| 5,708,960 A | | 1/1998 | Kamisaka et al. ........... | 455/3.2 |
| 5,740,549 A | * | 4/1998 | Reilly et al. .................. | 705/14 |
| 5,926,624 A | * | 7/1999 | Katz et al. .................... | 709/217 |
| 5,928,331 A | | 7/1999 | Bushmitch .................. | 709/231 |
| 6,052,730 A | * | 4/2000 | Felciano et al. ............. | 709/225 |
| 6,055,570 A | * | 4/2000 | Nielsen ....................... | 709/224 |
| 6,061,718 A | | 5/2000 | Nelson ....................... | 709/206 |
| 6,081,518 A | | 6/2000 | Bowman-Amuah ........ | 370/352 |
| 6,147,975 A | | 11/2000 | Bowman-Amuah ........ | 370/252 |
| 6,199,096 B1 | | 3/2001 | Mirashrafi et al. .......... | 709/202 |
| 6,211,869 B1 | | 4/2001 | Loveman et al. ........... | 345/328 |
| 6,226,523 B1 | | 5/2001 | Karlsson et al. ............. | 455/466 |
| 6,236,991 B1 | | 5/2001 | Frauenhofer et al. ......... | 707/6 |
| 6,366,947 B1 | | 4/2002 | Kavner ....................... | 709/205 |
| 6,381,637 B1 | | 4/2002 | Kamada ..................... | 709/218 |
| 6,421,717 B1 | | 7/2002 | Kloba et al. ................ | 709/219 |
| 6,493,758 B1 | | 12/2002 | McLain ...................... | 709/207 |
| 6,505,242 B2 | * | 1/2003 | Holland et al. ............. | 709/219 |
| 6,591,288 B1 | * | 7/2003 | Edwards et al. ............ | 709/203 |
| 2001/0003828 A1 | | 6/2001 | Peterson et al. ............ | 702/49 |
| 2001/0007105 A1 | * | 7/2001 | Brotz et al. .................. | 707/1 |
| 2002/0010758 A1 | * | 1/2002 | Chan .......................... | 709/218 |

FOREIGN PATENT DOCUMENTS

| | | | |
|---|---|---|---|
| WO | WO 00/56088 | 9/2000 | ............ H04Q/7/22 |
| WO | WO 00/57610 | 9/2000 | ........... H04L/29/00 |
| WO | WO 00/57610 A3 | 9/2000 | ........... H04L/29/06 |
| WO | WO 00/64203 | 10/2000 | ........... H04Q/7/22 |
| WO | WO 01/28171 A1 | 4/2001 | ........... H04L/12/58 |
| WO | WO 01/33781 A1 | 5/2001 | ........... H04L/12/58 |
| WO | WO 01/33782 A1 | 5/2001 | ........... H04L/12/58 |

OTHER PUBLICATIONS

Patel, A. and Gaffney, K., "A technique for multi–network access to multimedia messages", Computer Communications 20 (1997), pp. 321–337.

PCT International Search Report, International Application No. PCT/IB02/05521, Date of Completion Search—Mar. 10, 2003, Sheet 1, Continuation of First Sheet and Sheet 2.

PCT International Search Report, International Application No. PCT/IB02/03353, Date of Completion of Search—Feb. 21, 2003, Sheets 1, Continuation of First Sheet (2) and 2.

* cited by examiner

Primary Examiner—Dung C. Dinh
(74) Attorney, Agent, or Firm—Morgan & Finnegan, L.L.P.

(57) ABSTRACT

A mobile browsing booster system and method that allows a user to browse web services, select a class of delivery using the browser, and receive updates of frequently visited and related content at his or her wireless terminal, such as a cellular phone. The system is comprised of two parts; a browsing agent and a user database. The combination stores and analyzes a user's web-browsing habits to create personalized and optimized content to be preferably time-delay delivered to the memory of the user's wireless terminal device, at a time when the wireless network is least utilized. The scheduling of delivery is accomplished by a mobile content delivery system.

37 Claims, 5 Drawing Sheets

MOBILE BROWSING BOOSTER SYSTEM

FIELD OF INVENTION

This invention relates to systems and methods for gathering and refining web browsing information, to be delivered as mobile content to a mobile wireless terminal, preferably using the best available delivery mechanism.

BACKGROUND INFORMATION

Internet browsing from stationary terminals such as a personal computer has become very popular and is essential to attract people to view value-added services on the internet. Mobile operators would prefer a wireless terminal device to be the most popular means by which the public accesses the internet. However, a majority of the internet services available today to the stationery terminal user cannot easily be delivered to the wireless terminal user for a variety of reasons including network capacity issues, slow web services, web pages designed for personal computers, rather than wireless terminals, as well as limitations on the browsing capabilities of the wireless terminals themselves, much to the dismay of wireless terminal users and operators alike.

For example, a wireless terminal user attempting to view medium to high density graphical content in real-time over a traditional wireless network will quickly become frustrated by the time delays resulting from traffic on the cellular and/or Internet networks, as well as the time delays imposed by the web service from which the user has requested the content. While traditional mobile operators have repeatedly attempted to deliver web-based content in real-time over a wireless network, they have been largely unsuccessful at minimizing the foregoing delays and ameliorating user frustration.

Therefore, there exists a need for a system and method whereby a mobile user can browse web-based content with ease from a wireless terminal.

SUMMARY OF THE INVENTION

In a preferred embodiment of the invention, there are provided a system and method whereby a user's browsing content habits can be tracked in a database allowing updates of content associated with the more frequently visited and related content (FVARC) sites to be downloaded to a user's wireless terminal. The user has the option of having the content updates linked to a delivery class, e.g., real-time delivery or, alternatively, delivery at a time when the cellular network is least utilized.

Briefly, in the preferred embodiment, the user browses a data network such as the Internet using a wireless terminal. A Mobile Browsing Booster System (MBBS) maintains a user database (e.g., a personal network cache) of the user's viewing habits. A browsing agent within the MBBS analyzes those habits using data mining techniques to determine the most frequently visited content and related content (e.g., URL's and web pages, whether whole or "stripped down" versions thereof). Periodically, the MBBS forwards the FVARC to a selected Mobile Content Delivery (MCD) System for delivery to the mobile terminal. The details of the MCD system are described in co-pending application Ser. No. 09/944,443, filed Aug. 31, 2001, a copy of which is incorporated herein by reference.

The MCD system acts as the scheduled delivery engine that calculates the predetermined time window during which the FVARC is to be delivered to the wireless terminal. The time window of delivery is calculated preferably taking into account such information as a delivery class specified by the user of the wireless terminal, the wireless network usage and relative capacity, as well as the terminal type and capabilities thereof. Depending on the message criticality, the FVARC can be scheduled for delivery during minimal network usage traffic time periods for least expense unless delivery in real-time was requested by the user. During the scheduled delivery time window, the MCD system delivers the FVARC to the wireless terminal. The process of monitoring and analyzing viewing habits and gathering FVARC for delivery to the wireless terminal is repeated with a user-specified frequency to ensure that the user' terminal cache has the latest FVARC for local browsing.

The system and method of the present invention permits a wireless terminal user to browse FVARC stored in the terminal's local cache memory in a time-efficient manner without a wireless network connection. Thus, the wireless terminal user can read a large number of web pages quickly using offline browsing, instead of reading the pages over a network with unpredictable response times. Moreover, when combined with the MCD System, the present invention allows service operators to maximize their use of the wireless network air interface time resulting in a reduction in cost to send content updates over the wireless network. Thus, the present invention introduces a mechanism by which mobile operators can provide wireless terminal users with web-based content that previously could only be viewed at stationary terminals, resulting in a cost reduction of data services, thus enabling more services to become available and attracting more users.

Other and further aspects of the present invention will become apparent during the course of the following description and by reference to the attached drawings.

DETAILED DESCRIPTION OF THE INVENTION

Figure 1:
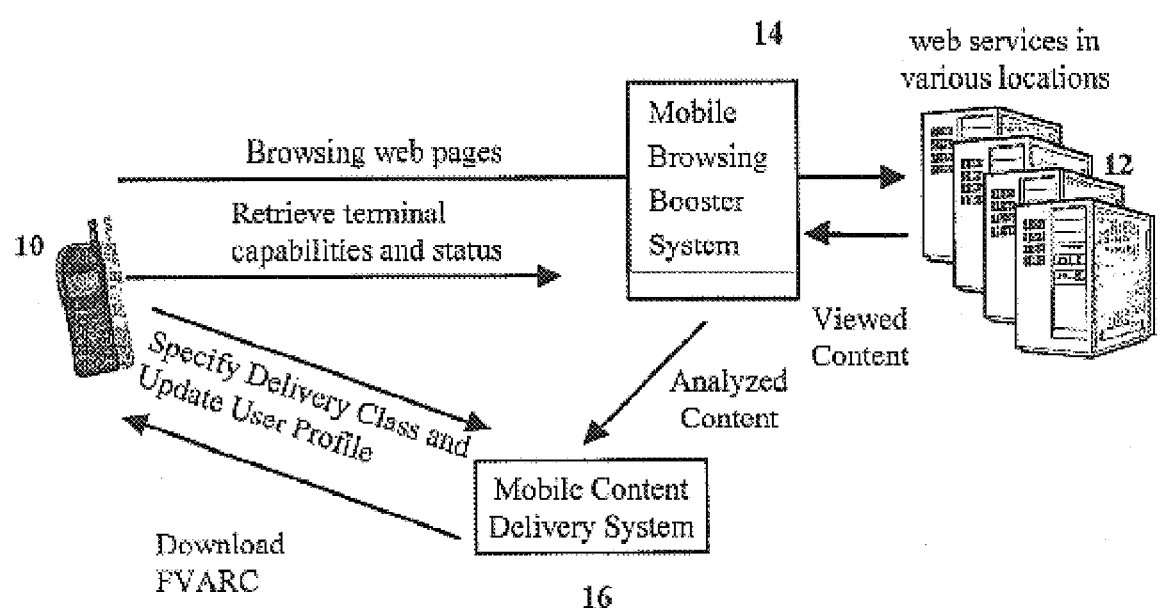
FIG. 1 is a block diagram illustrating an exemplary implementation of the Mobile Browsing Booster System (MBBS) in accordance with one embodiment of the present invention.

FIG. 1 is a block diagram illustrating an exemplary implementation of a Mobile Browsing Booster System (MBBS) in accordance with one embodiment of the present invention. As shown in FIG. 1, an individual may use a hand-held wireless terminal 10 (e.g., a cellular phone) enabled with a browser to browse web-based content available from web services 12 via a data network such as the internet.

In accordance with one embodiment of the present invention, the user of the wireless terminal may register to receive periodic updates of the user's frequently visited and related content (FVARC) for storage in the terminal's cache memory to enable local browsing of such content. To register for the service, the user of terminal 10 may access Mobile Content and Delivery system 16 and provide it with a user profile and a class of delivery for the FVARC. The user profile may include the user-defined parameters for FVARC updates, such as the type of FVARC that the user would like updated to the terminal's cache, the frequency of the updates, etc. The class of delivery may be delivery at a time when the cellular network is least utilized or, alternatively, in "real-time" (as discussed in co-pending application Ser. No. 09/944,443, filed Aug. 31, 2001) when triggered by an event specified in the user profile such as a predetermined period of time having elapsed since the last update was transmitted to the wireless terminal 10. It will be understood that upon registering, the user can at any time thereafter contact MCD system 16 and update his profile to change one or more of the user-defined parameters, including the class of delivery.

Once the user has registered for the service, a Mobile Browsing Booster System (MBBS) 14 monitors the user's browsing habits and stores information concerning those habits in a user database. The stored information may include the http address of a browsed site and the content that the user accessed at the site (e.g., web page(s)). Over time, the MBBS 14 analyzes the stored information to identify frequently visited content and related content using data mining techniques. In addition, during the user's browsing sessions, MBBS 14 also retrieves wireless terminal 10's capabilities and status to determine the type of content that terminal 10 is capable of presenting to the user. MBBS 14 uses this information to, if possible, modify the FVARC into a format suitable for presentation on terminal 10 or, if not possible, delete such content from its database altogether.

MBBS 14 forwards the analyzed content in the form of FVARC to the MCD system 16, which schedules delivery of the FVARC to terminal 10 by analyzing the class of delivery previously specified by the user, the existing network activity loading and the content size. At the scheduled delivery time, the MCD system 16 delivers the content to the wireless terminal 10.

Figure 2:
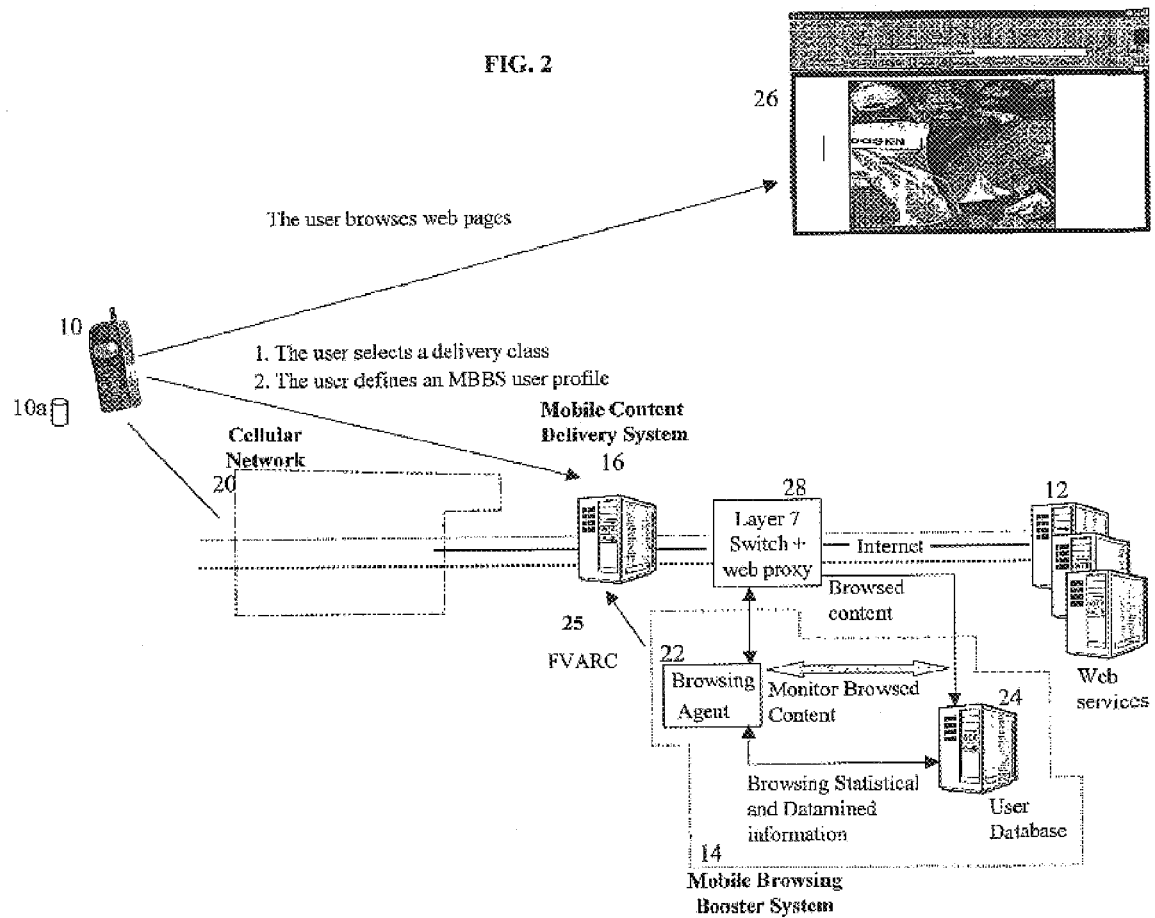
FIG. 2 is a block diagram illustrating an exemplary implementation of the MBBS of the present invention in greater detail.

FIG. 2 is a block diagram illustrating an exemplary implementation of the MBBS 14 in greater detail. The network components shown in FIG. 2 for purposes of illustrating the exemplary implementation are: a cellular network 20; a MCD System 16; a layer 7 switch/web proxy 28, the MBBS 14, which comprises a Browsing Agent 22 and a User Database 24; and web services 12.

As discussed above in connection with FIG. 1, the user of wireless terminal 10 registers with MCD system 16 for the mobile browsing booster service of the present invention or updates his user profile if already registered, in any number of ways known in the art such as via a wireless connection over cellular network 20, via postal mail or the like. Thus, in so doing, the user defines a user profile for receiving FVARC updates to the terminal cache 10a of his wireless terminal 10 and, as part of his profile, may also select the class of delivery for such updates.

MCD System 16 then relays the user profile (newly created or updated) to MBBS 14 for storage in user database 24. User database 24 includes a user profile and a personal network cache for each user, wherein FVARC is stored pending delivery to wireless terminal 10, as will be described in detail hereinafter.

As shown in FIG. 2, a registered user browses web services 12, and thus, visits web sites that contain content such as web page 26. Wireless terminal 10 receives the browsed content over a data network such as the Internet, an extranet, an intranet LAN or the like over a wireless connection via a cellular network 20. The L7 switch/web proxy 28 monitors web traffic, identifies content browsed by wireless terminal 10 as corresponding to a terminal that has registered for the mobile browsing booster service and transmits a copy of that content to the MBBS 14 for storage in the user's personal network cache in user database 24.

The Browsing Agent 22 of MBBS 14 begins gathering frequently visited and related content (FVARC) by monitoring content stored in the user's personal network cache for frequency and preferably also type (i.e., the number of visits to the site associated with the content and the type of content). Thus, the gathered content may comprise either frequently visited content of any type or frequently visited content of a specific type (e.g., a predefined group, such as "sports"), depending upon what is required by the user's profile. If the user has requested updates only of frequently visited content of a specific type, browsing agent 22 may use data mining techniques to cull such content from all of the content stored in the user's network cache.

Browsing agent 22 may also use data mining to supplement the FVARC with "related" content—e.g., URL's and web pages of sites that the user would likely have an interest in visiting in the future. For example, the browsing agent 22 may supplement FVARC with content retrieved from the personal network caches of other users whose profiles indicate that they have similar interests as those of the user for whom the FVARC is being gathered (provided that the profiles of the other users permit such snooping). Browsing agent 22 may further supplement FVARC by determining that the content frequently visited by the user belongs to one or more pre-defined groups (e.g., news, sports, content that is high or low in graphics, content from specific types of web services, etc.) and by searching the data network via the L7 switch/web proxy 28 for web services that contain content from those groups. As indicated above, the browsing agent 22 may already know the pre-defined groups from the user's profile or may use data mining to ascertain the groups from the content frequently browsed by the user.

Based upon the frequency of updating FVARC specified in the user's profile (e.g., some profiles may specify that updates occur more frequently than others), the MBBS 14 forwards the FVARC to the MCD system 16. (See reference numeral 25 in FIG. 2) MCD system 16 schedules delivery of the FVARC to the wireless terminal 10 within a particular time window determined by analyzing the user-selected class of delivery, the existing network activity loading, the content size and the cell location. Thus, MCD system 16 may retrieve wireless network activity updates and current cell user location from the Cellular Network 20. Depending on network data activity, the MBBS 14 may re-direct the FVARC to another MCD system 16 having a lighter network server data activity load.

When the time window for delivery arrives, the MCD system 16 delivers the FVARC to the end-user at the wireless terminal 10 via the cellular network 20. Once the FVARC has been delivered, the user can open the browser of his wireless terminal 10 and browse web pages from the terminal's cache memory without the need for a live wireless network connection. Thus, the user's browsing sessions will have minimal time delays making the experience a pleasant one. At some point, however, if the user selects a link that leads to a web page that is not stored in the terminal cache 10a, the terminal 10 will need to establish a network connection to retrieve that web page.

It will be readily apparent to those skilled in the art that numerous variations in the architecture and functionality depicted in FIG. 2 can be made without departing from the spirit or scope of the present invention. For example, an equivalent of database 24 (with personal network caches) could be located at L7 switch/web proxy 28, rather than at MBBS 14, in which case the browsing agent 22 would perform the content optimization process by accessing the personal network caches stored therein. Alternatively, both L7 switch/web proxy 28 and MBBS 14 could maintain personal network caches for each user. In this embodiment, the content in the MBBS 14 caches could mirror the content in the switch/web proxy 28 caches or, the caches in switch/web proxy 28 could be used to store all browsed content (with content optimization being performed by accessing that content) and the caches in database 24 of MBBS 14 could be used to store only FVARC.

Figure 3:
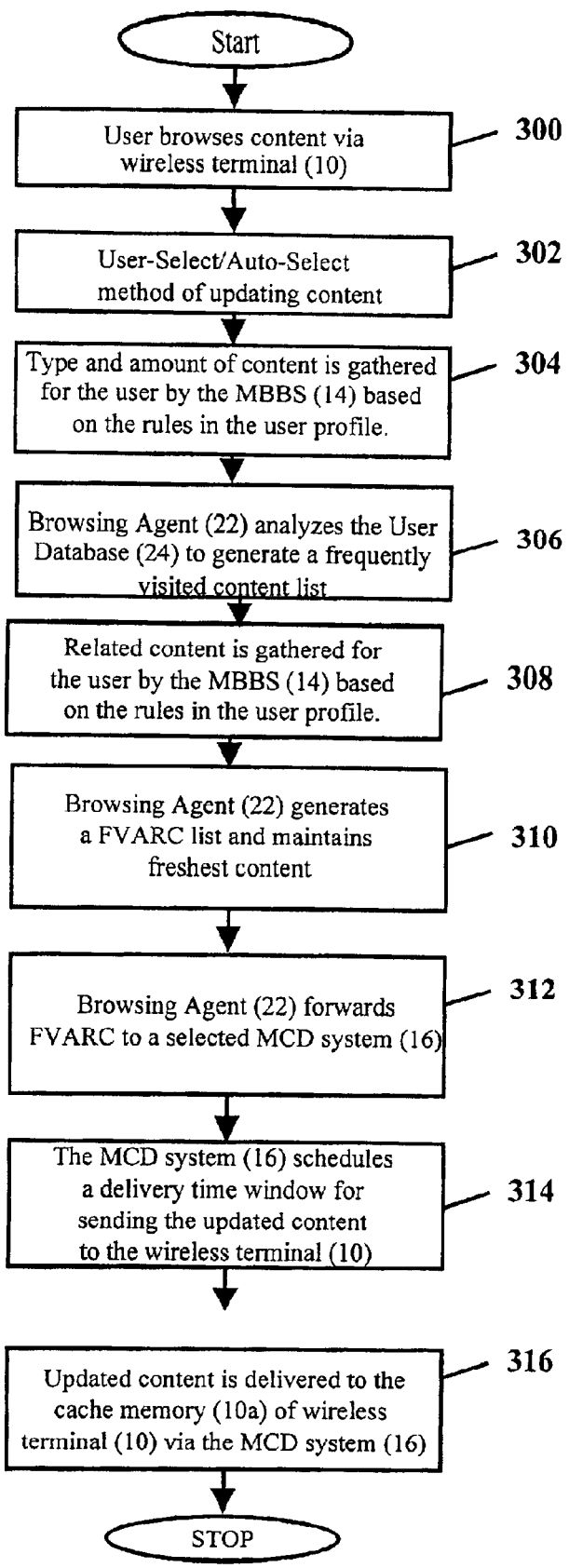
FIG. 3 is a flow chart illustrating an exemplary process by which updated content is generated and delivered to a wireless terminal in accordance with one embodiment of the present invention.

FIG. 3 is a flow chart illustrating an exemplary process by which updates of FVARC are generated and delivered to a wireless terminal in accordance with one embodiment of the present invention. In step 300, the user browses web-based content via a wireless terminal 10. In step 302, the user chooses either a User-selected or Auto-Selected class of delivery, as discussed in co-pending application Ser. No. 09/944,443, filed Aug. 31, 2001, for receiving updates of FVARC. In step 304, the browsing agent 22 of the MBBS 14 monitors the user's browsing activity and selects content of the type and the amount specified by rules in the user's profile. For example, MBBS 14 may monitor for all hockey news that does not include graphics. Browsing agent 22 then stores the selected content and associated URI,s in the user's network cache in user database 24 of the MBBS 14. In step 306, browsing agent 22 analyzes the selected content to determine frequently visited content. If required by the user's profile, in step 308, the browsing agent 22 also gathers content related to the frequently visited content. Thus, in step 310, the browsing agent 22 generates a list of frequently visited and related content (FVARC). If also required by the user's profile, the browsing agent 22 will periodically access the latest (i.e., "freshest") version of the FVARC and replace therewith the older version of the content in the user's network cache.

In step 312, browsing agent 22 forwards the FVARC to an MCD system 16. In step 314, MCD system 16 schedules a window of time for delivery of the FVARC to wireless terminal 10, taking into account the user-specified class of delivery. In step 314, at the appropriate time, MCD system 16 delivers the FVARC to wireless terminal 10, where it is stored in the terminal's cache 10a, and thus, is available for local browsing.

Figure 4:
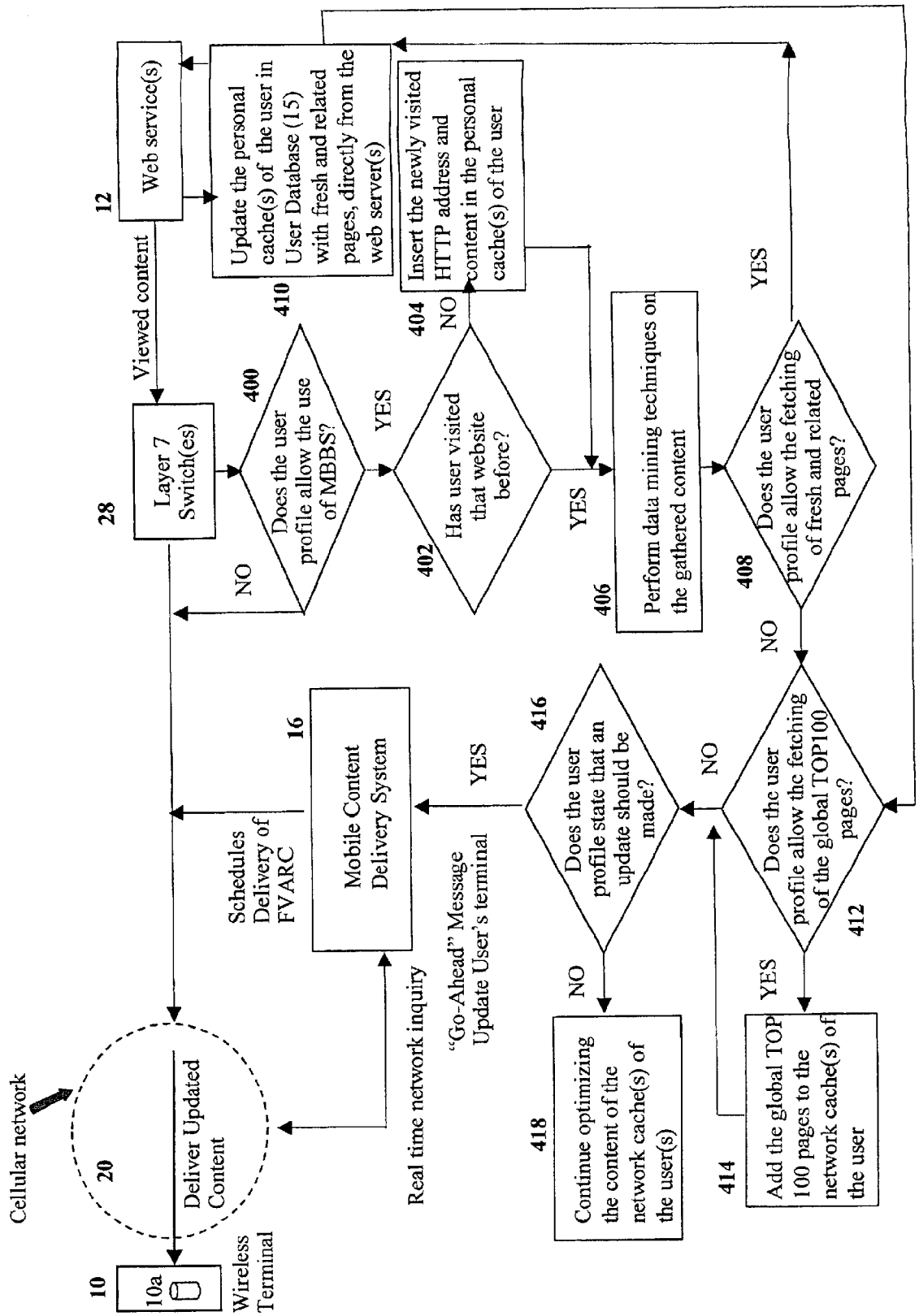
FIG. 4 is a flow chart illustrating the exemplary process of FIG. 3 in greater detail.

FIG. 4 is a flow chart illustrating the exemplary process of FIG. 3 in greater detail. As shown in FIG. 4, a wireless terminal 10 can access web services 12 via cellular network 20. Content visited by wireless terminal 10 passes through one or more L7 switches equipped with a web proxy 28. In step 400, L7 switch/web proxy 28 determines whether the wireless terminal 10 has registered for the mobile browsing booster service. In this regard, the MCD system 16 can provide switch/web proxy 28 with an identity of registered users (e.g., a mobile station's ISDN number). The switch/web proxy 28 can then compare the identity provided by MCD system 16 with an identifier from the user's browsing session (e.g., the MSISDN number) to link an HTTP/IP stream to a registered user. Alternatively, switch/web proxy 28 can attempt to use the identifier from the browsing session to access a user profile in user database 24 or an existing wireless user identity database to determine whether the web traffic is associated with a registered user.

If the switch/web proxy 28 determines that the mobile browsing booster service is not enabled for wireless terminal 10, switch/web proxy 28 passes the browsed content to the wireless terminal 10 without sending a copy to MBBS 14. However, if the mobile browsing booster service is enabled for this user, a copy of the browsed content is sent to MBBS 14 for storage in the user's personal network cache in user database 24.

In step 402, browsing agent 22 of MBBS 22 determines whether wireless terminal 10 has ever before visited the web site. If this web site is newly visited, then, in step 404, the browsing agent 22 adds the http address (e.g., the URL) of the web site and the associated content into the user's personal network cache in user database 24. Over time, the user's browsing history will be stored in the network cache. Regardless of whether or not the current web site is newly visited, in step 406, browsing agent 22 performs data mining techniques on the content stored in the user's network cache to identify frequently visited content of the type (e.g., sports, weather, news, etc) indicated in the user's profile.

The user's profile is then checked to determine whether the frequently visited content is to be supplemented with additional content that may be of interest to the user. This "related" content is added to the frequently visited content thereby generating frequently visited and related content (FVARC). Thus, in step 408, browsing agent 22 determines whether the user's profile allows content related to the frequently visited content and the latest version of such content is to be fetched from web service(s) 12. If fetching of related content and the latest version thereof is allowed, in step 410, browsing agent 22 accesses web services 12 via a data network and retrieves such content. If the user's profile permits, browsing agent 22 may also access the latest version of frequently visited content at this time. It should be noted that L7 switch/web proxy 28 may be capable of automatically synchronizing content accessed by either wireless terminal 10 or browsing agent 22 and stored in its cache with the latest available versions of that content. In that case, browsing agent 22 would be able to obtain the latest versions of either frequently visited content or related content from switch/web proxy 28, rather than from web services 12.

Thereafter, in step 412, browsing agent 22 determines whether the user profile allows fetching of the most popular TOP100 pages or the like. The TOP100 pages can be retrieved in any number of ways such as from a global cache in web proxy 28 or from other network servers where such lists may reside or may even be compiled by browsing agent 22 from content in the network caches of other users in user database 24. If fetching of the most popular TOP100 pages is allowed, in step 414, these pages are added to the user's network cache in user database 24.

In step 416, the browsing agent 22 accesses the user profile to determine whether an update of FVARC should be sent to the terminal cache 10a of wireless terminal 10. As discussed above, the frequency of FVARC updates may vary depending upon the frequency specified in the user profile. If an update should not yet be made, in step 418, browsing agent 22 continues optimizing the content of the user's network cache by repeating steps 400 through 418.

As content optimization steps 400 through 418 are repeated, browsing agent 22 also performs maintenance on each user's personal network cache by removing content that is infrequently accessed or which is related to content that is infrequently accessed. Browsing agent 22 preferably also converts content into a format and size suitable for a wireless terminal (e.g., using wireless mark-up language (wml) and/or wireless application protocol (wap)). If such conversion is not possible, browsing agent 22 may delete such content entirely from the user's network cache. Moreover, to facilitate filtering of FVARC by the user, browsing agent 22 may highlight the most frequently visited content to distinguish it, e.g., from related content prior to transmission to MCD system 16. Alternatively, or in addition thereto, agent 22 may also highlight the portion of the FVARC that has changed since the last time FVARC was transmitted to wireless terminal 10. Highlighting may involve adding colors or bold text to the wml/html code of the web content in a manner well known to those skilled in the art.

If the user profile indicates that an update of FVARC should be made, browsing agent 22 sends the FVARC to MCD system 16 together with a "go-ahead" message instructing MCD system 16 to update the user's terminal cache 10a. The Mobile Content Delivery (MCD) system 16 schedules delivery of the FVARC by analyzing the class of delivery, the existing network activity loading, which it receives from cellular network 20, and the content size. The FVARC is then delivered to wireless terminal 10 by means of cellular network 20.

Figure 5:
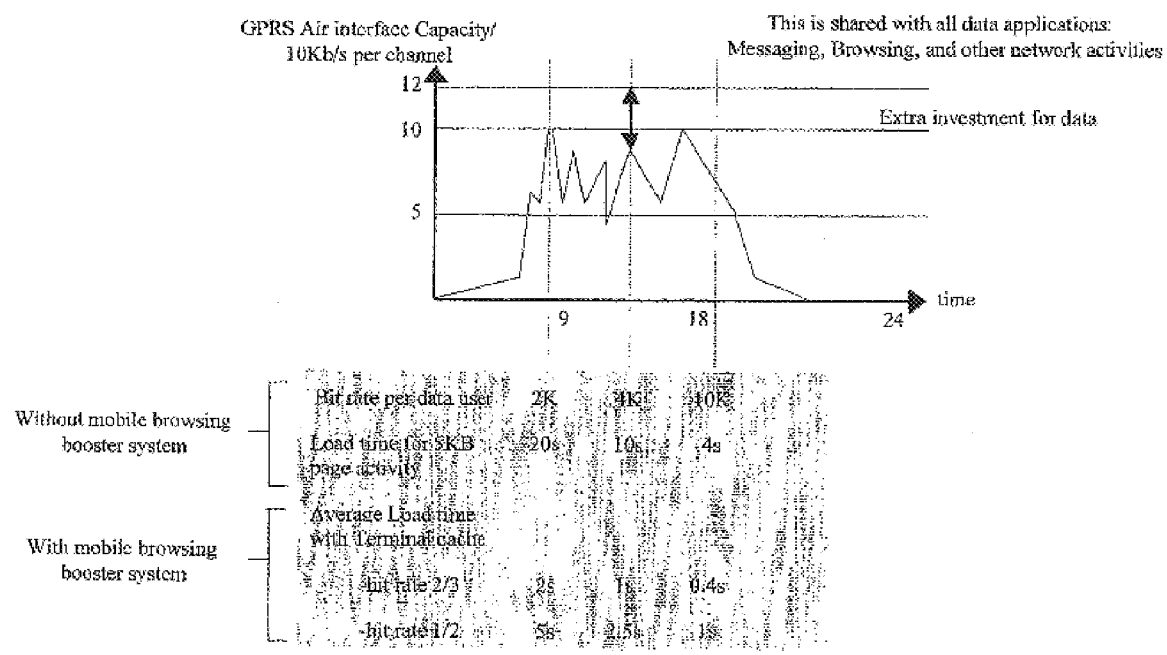
FIG. 5 is a diagram illustrating some of the benefits that can be achieved by updating web-based content at the wireless terminal's cache memory 10a at an opportune time in accordance with the present invention.

FIG. 5 is a diagram illustrating some of the benefits that can be achieved by updating web-based content at the wireless terminal's cache memory 10a at an opportune time in accordance with the present invention. The vertical axis represents a wireless network's air interface capacity in kilobits per channel per user and the horizontal axis represents the twenty-four hour day time cycle of the wireless network.

As shown in the graph, typical air interface capacity has a ceiling of 10 kilobits per second (Kb/s) per user channel unless the operator is willing to invest in additional hardware to increase the capacity to possibly 12 Kb/s per user channel. Above 12 Kb/s channel capacity is where messaging, online browsing, and other shared data applications reside.

As illustrated in the chart of FIG. 5, without the present invention, at approximately the ninth hour, the network air interface capacity is being fully utilized allowing for a limited bit rate per user of only 2 Kb/s, which results in a 20 second load time to update a 5 kilobyte (KB) web content page. With the Mobile Browsing Booster System 14 implemented that same 5 KB web content page will be loaded into the cache memory of wireless terminal 10 in 2 seconds for a hit-rate of ⅔, and 5 seconds for a hit-rate of ½. It should be noted that the hit-rate is based on the fraction of web pages that have a delayed class of delivery out of a 200 web page sample.

In the other two cases without the present invention, bit data rates per user of 4 Kb/s and 10 Kb/s will result in 5 KB web page load times of 10 seconds and 4 seconds respectively. In comparison, with the present invention implemented, web page load times of 1 second and 0.4 seconds respectively can be achieved at the ⅔ hit-rate for that same web page. For a hit-rate of ½, web page load times slightly increase to 2.5 seconds and 1 second respectively.

The wireless terminal 10 will have previously browsed FVARC content stored in its local cache memory, the improvements in user-browsing update loading times can be as much as 10 times faster than that of a system without the Mobile Browsing Booster System 14 implemented.

RAMIFICATION AND SCOPE

Although the description above contains many specifics, these are merely provided to illustrate the invention and should not be construed as limitations of the invention's scope. Thus, it will be apparent to those skilled in the art that various modifications and variation an be made in the system and processes of the present invention without departing from the spirit or scope of the invention. Accordingly, it is intended that the present invention cover its modification and variations provided they come within the scope of the appended claims and their equivalents. In this context, "equivalents" means each and every implementation for carrying out the functions in the claims, even if not explicitly described herein.

We claim:

1. A method to enable a user of a wireless terminal to browse content, comprising:

monitoring browsing activity of a user of a wireless terminal;

storing content browsed by said user in a personal network cache;

analyzing said browsed content to determine frequently visited content; and in response to a predetermined period of time having elapsed, periodically transmitting said frequently visited content to a terminal cache of said wireless terminal to enable said user of said wireless terminal to locally browse said frequently visited content without having to establish a network connection to browse said content.

2. The method of claim 1 wherein said frequently visited content is of a type specified by said user of said wireless terminal.

3. The method of claim 1, further comprising:

identifying content related to said frequently visited content; and transmitting said related content to a terminal cache of said wireless terminal to enable said user of said wireless terminal to locally browse said related content without having to establish a network connection.

4. The method of claim 3, wherein said related content is extracted from personal network caches of other wireless terminal users having similar interests to said user of said wireless terminal.

5. The method of claim 3, further comprising:

highlighting said frequently visited content to distinguish it from related content.

6. The method of claim 1 wherein said frequently visited content is transmitted to said wireless terminal as frequently as specified by said user of said wireless terminal.

7. The method of claim 6, further comprising:

highlighting portions of said frequently visited content that have changed since frequently visited content was last transmitted to the wireless terminal.

8. The method of claim 1 wherein said frequently visited content is transmitted to said wireless terminal at a time when the wireless network is less utilized.

9. The method of claim 1 further comprising:

deleting browsed content that does not qualify as frequently visited content.

10. The method of claim 1 further comprising:

formatting frequently visited content for presentation on said wireless terminal; and deleting portions of frequently visited content that cannot be formatted for presentation on said wireless terminal.

11. The method of claim 3 further comprising:
retrieving latest versions of said frequently visited content from a data network.

12. The method of claim 1, further comprising:
receiving a class of delivery for transmitting said frequently visited content to said wireless terminal.

13. The method of claim 12 wherein said class of delivery, network capacity usage and size of said frequently visited content determines when said step of transmitting said frequently visited content is to occur.

14. The method of claim 12, further comprising:
receiving a user profile indicating a type of frequently visited content to be gathered and transmitted to the user.

15. The method of claim 1 wherein said frequently visited content comprises web pages.

16. A method to enable a user of a wireless terminal to browse data network-based content, comprising:
registering with a network entity for updates of frequently visited content stored in a personal network cache to be periodically transmitted to said wireless terminal over a wireless network in response to a predetermined period of time having elapsed;
browsing data network-based content over a wireless connection;
receiving periodic updates of frequently visited content over said wireless network, wherein said period of said updates is pre-specified by said user;
storing said updates of said frequently visited content in cache memory of said wireless terminal; and
locally browsing said frequently visited content from said cache memory without having to establish a network connection to browse said frequently visited content.

17. The method of claim 16, further comprising:
providing a user profile indicating a type of frequently visited content for which said user would like to receive an update.

18. The method of claim 16, further comprising:
providing a class of delivery for receiving said update of frequently visited content.

19. The method of claim 18 wherein said class of delivery is for a delayed delivery at a time when the wireless network is less utilized.

20. The method of claim 16 further comprising:
receiving content related to said frequently visited content;
storing said related content in cache memory of said wireless terminal; and
locally browsing said related content from said cache memory without having to establish a network connection to browse said related content,
wherein said network connection is either a wireless network connection or a data network connection.

21. A wireless terminal, comprising:
a cache;
a memory device storing a program;
a processor in communication with said memory device;
said processor operative with said program to:
register with a network entity for updates of frequently visited content stored in a personal network cache to be periodically transmitted to said wireless terminal over a wireless network in response to a predetermined period of time having elapsed;
receive eriodic updates of frequently visited content over a said wireless network;
store said periodic updates of said frequently visited content in said cache; and
permit a user to locally browse said frequently visited content from said cache without having to establish a network connection to browse said frequently visited content.

22. The wireless terminal of claim 21, wherein said processor is further configured with said program to:
provide a user profile indicating a type of frequently visited content for which said user would like to receive periodic updates.

23. The wireless terminal of claim 21, wherein said processor is further configured with said program to:
provide a class of delivery for receiving said periodic updates of frequently visited content.

24. The wireless terminal of claim 23 wherein said class of delivery is for a delayed delivery at a time when the wireless network is less utilized.

25. A mobile browsing booster system, comprising:
a layer 7 switch equipped with a web proxy for monitoring data network-based browsing activity of a wireless terminal user;
a database for storing content browsed by said user in a personal network cache; and
a browsing agent for:
analyzing said content stored in said personal network cache to determine frequently visited content; and
in response to a predetermined period of time having elapsed, periodically transmitting updates of said frequently visited content to a terminal cache of said wireless terminal to enable said user of said wireless terminal to locally browse said frequently visited content without having to establish a network connection to browse said frequently visited content.

26. The system of claim 25, wherein said browsing agent analyzes said content stored in said personal network cache to determine frequently visited content of a particular type specified in a user profile.

27. The system of claim 25, further comprising:
a mobile content delivery system for scheduling delivery of said frequently visited content to said terminal cache of said wireless terminal,
wherein said browsing agent transmits said frequently visited content to said terminal cache via said mobile content delivery system.

28. The system of claim 25, wherein said layer 7 switch equipped with a web proxy compares an identifier from a user's browsing session with information from a wireless user identity database to determine whether said browsing activity of said wireless terminal user should be monitored.

29. The system of claim 25, wherein said browsing agent retrieves content related to said frequently visited content and transmits said related content to said terminal cache of said wireless terminal.

30. The system of claim 29, wherein said browsing agent accesses the latest version of said frequently visited content and related content.

31. The system of claim 30, wherein,
said layer 7 switch equipped with a web proxy automatically synchronizes content browsed by said user of said wireless terminal or accessed by said browsing agent and stored in a cache of said web proxy with latest versions of said content available from web services; and said browsing agent accesses the latest versions of said frequently visited content and said related content from said layer 7 switched equipped with said web proxy, rather than from said web services.

32. The system of claim 25, wherein said layer 7 switch equipped with a web proxy includes a cache divided into a plurality of personal network caches.

33. The system of claim 25, wherein said database is divided into a plurality of personal network caches, and wherein each of said plurality of network caches is assigned to a different user of a wireless terminal who has registered to receive updates of frequently visited content.

34. The system of claim 25, wherein said browsing agent converts frequently visited content into a format and size suitable for presentation on said wireless terminal of said user.

35. The system of claim 30, wherein said browsing agent highlights frequently visited content to distinguish it from related content.

36. The system of claim 25 wherein said browsing agent highlights portions of frequently visited content that have changed since frequently visited content was last transmitted to said terminal cache of said wireless terminal.

37. The system of claim 29, wherein said frequently visited content and said related content are stored in said personal network cache prior to transmission to said terminal cache of said wireless terminal.

* * * * *

UNITED STATES PATENT AND TRADEMARK OFFICE
CERTIFICATE OF CORRECTION

PATENT NO. : 6,820,116 B1
DATED : November 16, 2004
INVENTOR(S) : Seppo Pyhälammi et al.

It is certified that error appears in the above-identified patent and that said Letters Patent is hereby corrected as shown below:

Title page,
Item [75], Inventors, delete "Iikka" and replace with -- Ilkka --.

Signed and Sealed this

Tenth Day of January, 2006

JON W. DUDAS
*Director of the United States Patent and Trademark Office*